Feb. 13, 1962 W. P. KISTLER 3,020,767
LINEAR ACCELEROMETER
Filed Oct. 5, 1959
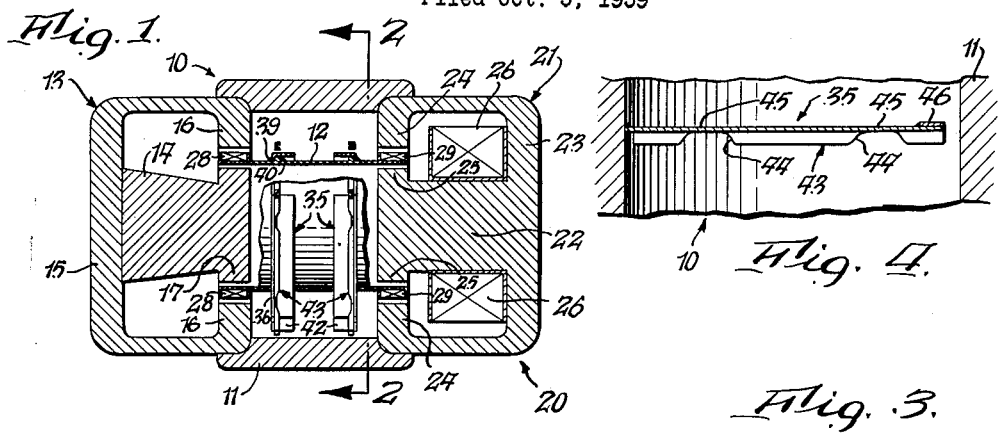
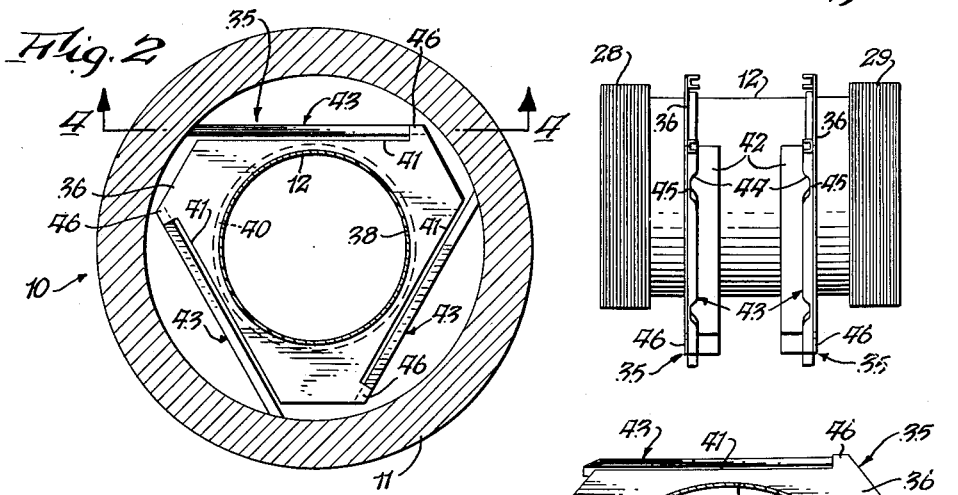
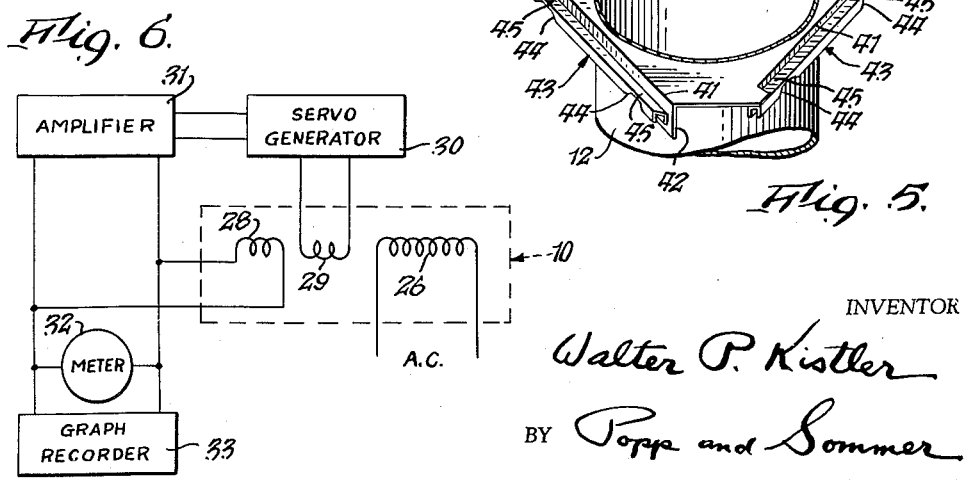
INVENTOR
Walter P. Kistler
BY Popp and Sommer
ATTORNEY _United States Patent Office_  3,020,767
Patented Feb. 13, 1962

3,020,767
LINEAR ACCELEROMETER
Walter P. Kistler, North Tonawanda, N.Y., assignor to Kistler Instrument Corporation, North Tonawanda, N.Y., a corporation of New York
Filed Oct. 5, 1959, Ser. No. 844,512
6 Claims. (Cl. 73—497)

This invention relates to a linear accelerometer and more particularly to a balanced accelerometer in which an electrical signal generated by movement of a movable mass is applied to a servo-generator, amplified and employed to return the movable mass to its original position, any meters, recorders or control instruments being connected across the output of the amplifier.

An important object of the invention is to provide such an accelerometer having a high degree of accuracy, the accuracy of the accelerometer being in the order of .001%.

Another object is to provide such an accelerometer which is linear in its response.

Another object is to provide such an accelerometer in which the suspension for the moving mass is substantially error proof.

Another object is to provide such a suspension which is free from internal tensions and in particular any internal tension such as would induce any part to snap from one position to another or to produce any irregularity in the movement of the moving mass.

Another object is to provide such a suspension which is quite rigid in any direction perpendicular to the sensitive axis of the instrument in order to guide the moving mass with considerable restraint to move linearly along said sensitive axis.

Another object is to provide such an accelerometer which has no bearings, jewel or otherwise, and is free from friction and the irregularities attendant upon frictional suspensions particularly in overcoming starting or threshold friction.

Another object is to provide such an accelerometer which is not affected by temperature changes, temperature merely rotating the moving mass about its axis of normal travel.

Another aim is to provide such an accelerometer which is free from cross coupling error, this again being due to the fact that travel of the moving mass is linear along the sensitive axis attended only by a slight rotational movement about this axis.

Another object is to provide such an accelerometer in which any type of pickoff, such as an optical or capacitance pickoff, can be used, an inductive pickoff being illustrated.

Another object is to provide such an accelerometer which does not require close tolerances of manufacture and which at the same time is highly accurate and linear in output.

Another aim is to provide such an accelerometer which is extremely simple and low in cost considering the function which it performs and its high degree of accuracy and linearity.

Other objects and advantages of the invention will be apparent from the following description and drawings in which:

FIG. 1 is a vertical longitudinal central section through an accelerometer embodying the present invention.

FIG. 2 is an enlarged transverse section taken generally on line 2—2, FIG. 1.

FIG. 3 is a side elevational view of the moving mass, the inductive coils thereon, and the suspension therefor.

FIG. 4 is a fragmentary further enlarged section taken generally on line 4—4, FIG. 2.

FIG. 5 is a perspective view of the suspension for one end of the moving mass, the suspension for the other end being the same.

FIG. 6 is a wiring diagram illustrating one way in which the accelerometer can be used.

An accelerometer basically consists of a moving mass suspended in a frame with a means of measuring or using for control purposes the force exerted on this mass when the frame is being accelerated. The acceleration force is generally measured through a spring, the deflection of which is either recorded on paper directly or transferred into an electrical signal through a resistive, conductive, capacitive or optical pickoff.

In a linear servo accelerometer, such as the present, the acceleration force is measured and countered by an equal but opposite balancing force instead of a spring. The balancing force can be generated through a coil, generally known as a forcer coil, positioned in the air gap of a powerful permanent magnet. In order to keep the balancing force exactly equal to the accelerating force at any instant, the forcer coil is fed from the amplified output of a servogenerator. The servogenerator is in turn controlled from the pickoff associated with the moving mass. Such a linear servo accelerometer with a forcer coil and inductive pickoff is the illustrated embodiment of the present invention.

One of the major problems in the design of a servo accelerometer lies in the suspension of the moving mass. This mass should be so suspended that it is completely free to move in the direction of the sensitive axis of the accelerometer. Any constraining force above those required for calibration and adjustment will generate an error in the measurement, particularly if such constraining force is such as to be non-linear as a function of the displacement of the moving mass. On the other hand the suspension should be quite rigid or resistive in any direction perpendicular to the sensitive axis of the instrument in order to guide the moving mass accurately on a linear path along the axis.

The simplest form of accelerometer now on the market comprises a jewel pivot on which the moving mass is suspended eccentrically. Under acceleration the mass rotates over a small angle about the pivot. Such accelerometers have two basic faults. The dry friction inherent in the jewel pivot gives rise to hysteresis and limits the threshold of the instrument, both resulting in a non-linear response. The angular motion of the mass changes the direction of the sensitive axis under acceleration and causes so-called "cross coupling errors," that is, the instrument couples into transverse acceleration of the instrument and measures this too, whereas it should be ignored.

In a more elaborate accelerometer the jewel pivot has been replaced by a spring pivot using a cantilevered spring to sustain the mass. This arrangement avoids the hysteresis error but still results in the cross coupling error.

Another more elaborate accelerometer uses radially strung wires to suspend the mass. This avoids both the hysteresis and cross coupling error, but the movement of the mass is due wholly to slack in the wires and hence to avoid these errors this accelerometer lacks the first basic requirement for an accelerometer suspension, namely, freedom of motion of the mass in the direction of the sensitive axis. To be effective otherwise, the wires allow only an infinitesimal deflection of the mass along the sensitive axis. Also, since it is not possible to center the mass perfectly, the wires will often apply a deflecting force even when the accelerometer is at rest, causing null errors and null shifts.

The suspension for the present accelerometer is designed to avoid these disadvantages.

The accelerometer of the present invention is indicated generally at 10 and in the wiring diagram, FIG. 6, is indicated by dotted lines. The accelerometer is shown as including a cylindrical case or frame 11, preferably made of brass or other non-magnetic metal, containing a moving mass 12 in the form of a coaxial sheet metal cylinder. While this is referred to and functions as a moving mass, for maximum accuracy it is desirable to have it as light as possible and for this purpose it is made of very thin sheet metal, preferably of brass or some other non-magnetic metal.

The invention is illustrated in the form of a linear servo accelerometer and to this end a round high energy permanent assembly 13 is provided and which includes a magnet 14 is secured coaxially at one end of the cylindrical case or frame 11 by means of a cup-shaped, cylindrical, soft iron shield 15, the rim 16 of which is secured to the adjacent end of the case or frame 11 and projects radially inwardly into closely spaced relation with the corresponding end of the moving mass 12 to provide an air gap. The round permanent magnet 14 is shown as projecting coaxially from the end wall of the cup-shaped soft iron shield 15 and as having a radially enlarged head 17 at its outboard end arranged in the cylindrical mass 12 in closely spaced relation thereto and in opposing relation to the radially inwardly projecting rim 16 of the soft iron shield 15.

An alternating current electromagnet assembly 20 is mounted at the other end of the frame 11. This electromagnet assembly is shown as comprising a powdered iron core 21 having an inner coaxial part 22 and an integral shell 23, the shell being of cup-shaped cylindrical form and having its rim 24 fixed coaxially in the adjacent end of the case or frame 11. This rim also projects radially inwardly into closely spaced embracing relation with the corresponding end of the cylindrical mass 12 to provide an air gap. The inner part 22 of the powdered iron core 21 is provided at its outboard end with an enlarged head 25 arranged within and in closely spaced relation to the cylindrical mass 12 and in opposing relation to the radially inwardly projecting rim 25 of the shell 23. This inner part 22 of the powdered iron core carries the excitation coil 26 of the permanent magnet assembly.

The moving mass 12 carries a coil 28, 29 around each end. The coil 28 is a forcer coil and is centered in the circular air gap of the permanent magnet assembly 13 so that its wires cross the magnetic lines at right angles. The pickoff coil 29 is similarly centered in the circular air gap of the alternating current magnetic field of the electromagnet assembly 20 so that its wires cross the magnetic lines of force at right angles.

As illustrated in the wiring diagram, FIG. 6, the excitation coil 26 of the electromagnet assembly 20 is connected with a source of alternating current. The alternating voltage signal from the pickoff coil 29 is fed to a servogenerator 30 the direct current output from which is amplified by the amplifier 31 and fed to the forcer coil 28 to provide the balancing force. The alternating voltage signal from the forcer coil 29 is proportional to the axial displacement of the moving mass 12 and can be observed on the meter 32 or recorded on the graph recorder 33 which are across the output from the amplifier 31.

The present invention is essentially directed to the suspension for the moving mass 12 and which is in the form of two identical suspension units 35 between each end of the cylindrical moving mass 12 and the cylindrical frame 11. Each of these suspension units 35 is shown as made of light gage sheet metal, preferably non-magnetic, such as brass. Each comprises a transverse plate 36 having a central circular hole 38 closely fitting the corresponding end of the effective mass 12 and preferably soldered thereto as indicated at 39. An axially extending annular flange 40 is also preferably provided for each plate 36 in spaced relation to the cylindrical mass 12 and held in position by the solder 39.

Each plate is a plane perpendicular to the axis of the accelerometer and is shown as being of hexagonal form in elevation with three longer equally spaced sides 41 each provided with a transversely extending flange 42 and flanked by a rigid arm 43 which is arranged parallel with the corresponding flange 42 and hence in generally tangential relation to a circle concentric with or centered on the sensitive axis of the accelerometer. Each rigid arm is shown as being of channel form in cross section with the flanges of the channel projecting lengthwise of the sensitive axis and cut away or notched at each end on diametrically opposite sides, as indicated at 44, to provide flexible flat metal hinge leaves or sections 45 at opposite ends of each arm, these flexible flat metal hinge leaves or sections being flexible in the direction of the sensitive axis of the accelerometer but being stiff or resistive to flexure in all other directions. One end of each rigid arm 43 is secured, as by welding, to an ear 46 at one end of each long side 41 of each plate 36.

The other end of each rigid arm is rigidly secured, as by welding, to the bore of the frame or case 11.

In operation it will be seen that the cylindrical moving mass is constrained by the six rigid arms 43, swinging about the flat metal hinge leaves or sections 45 at their opposite ends, to move only along the sensitive axis of the accelerometer so that cross coupling error is avoided. Thus, these rigid arms are arranged tangential to a circle centered on the sensitive axis and since the flexible hinge sections 45 at opposite ends of these arms are flexible only in the direction of the sensitive axis, the moving mass 12 can move linearly along the sensitive action accompanied by such slight rotative or corkscrew action as results from the slight change in the effective length of the rigid arms 43 as they swing. This rotative movement has no effect upon the action of the pickoff coil 29 and forcer coil 28 on the moving mass 12 because these coils are concentric with the axis of such rotation. No problems of starting or threshold friction or operational friction, as with jewel bearings, are involved because the hinge portions 45 of the moving arms do not involve friction in their resilient support of the moving mass 12.

Accordingly, the alternating current voltage signal generated by movement of the forcer coil 29 in the air gap of the alternating current electromagnet 21 is exactly proportional to the displacement of the moving mass 12. This signal is fed to the servo-generator 30 the direct current output of which is amplified and fed to the forcer coil 28 to generate an electromagnetic force reacting against the field of the permanent magnet assembly 13 to balance the accelerating force displacing the moving mass 12 and thereby return the moving mass along its sensitive axis to its normal position. The output of the amplifier 31 can be measured or recorded as indicated or used for any other purpose.

From the foregoing, it will be seen that the present invention provides a very simple and low cost but at the same time linear and highly sensitive accelerometer which is free both from errors inherent in frictional suspensions and also cross coupling errors.

What is claimed is:

1. In a linear accelerometer having a frame and a moving mass arranged for movement along a sensitive axis in said frame, the combination therewith of a suspension for supporting said moving mass, comprising a group of substantially straight rigid arms at each end of said moving mass, the rigid arms of each group being interposed between said moving mass and frame in spaced relation to one another circumferentially about said moving mass tangential to a circle centered on said axis, and flat metal hinge leaves fixed to each end of each rigid arm and connected at their outboard ends respectively to the frame and moving mass, said flat metal hinge leaves of each rigid arm being flexible about parallel axes perpendicular to its arm and tangential to circles centered on said axis whereby said rigid arms restrict said mass to movement lengthwise of said axis plus such slight rotation about said axis as is incident to change in the effective length of said arms.

2. The combination set forth in claim 1 wherein said rigid arms are of sheet metal and of channel form in cross section.

3. The combination set forth in claim 1 wherein said rigid arms are of sheet metal and of channel form in cross section with their flanges extending lengthwise of said axis and wherein the flanges at opposite ends of each rigid arm are notched at diametrically opposite sides to provide said flat metal hinge leaves.

4. In a linear accelerometer having a frame and a moving mass arranged for movement along a sensitive axis in said frame, the combination therewith of a suspension for supporting said moving mass, comprising a plate fixed exteriorly to each end of said moving mass in a plane perpendicular to said axis, a group of substantially straight rigid arms arranged in each of said planes with said rigid arms in spaced relation to one another circumferentially about said moving mass tangential to a circle centered on said axis, and hinge means connecting the opposite ends of each of said arms with said frame and plates and flexible about parallel axes perpendicular to its arm and tangential to circles centered on said axis whereby said rigid arms restrict said mass to movement lengthwise of said axis plus such slight rotation about said axis as is incident to change in the effective length of said rigid arms.

5. The combination set forth in claim 4 wherein said rigid arms are made of sheet metal of channel form in cross section.

6. The combination set forth in claim 4 wherein said rigid arms, plates and hinge means are integral.

References Cited in the file of this patent

UNITED STATES PATENTS

| | | |
|---|---|---|
| 1,784,517 | Farrand | Dec. 9, 1930 |
| 2,021,330 | Ross et al. | Nov. 19, 1935 |
| 2,751,573 | Millington | June 19, 1956 |
| 2,753,544 | Cox et al. | July 3, 1956 |
| 2,767,973 | Ter Veen et al. | Oct. 23, 1956 |